Figure 1:
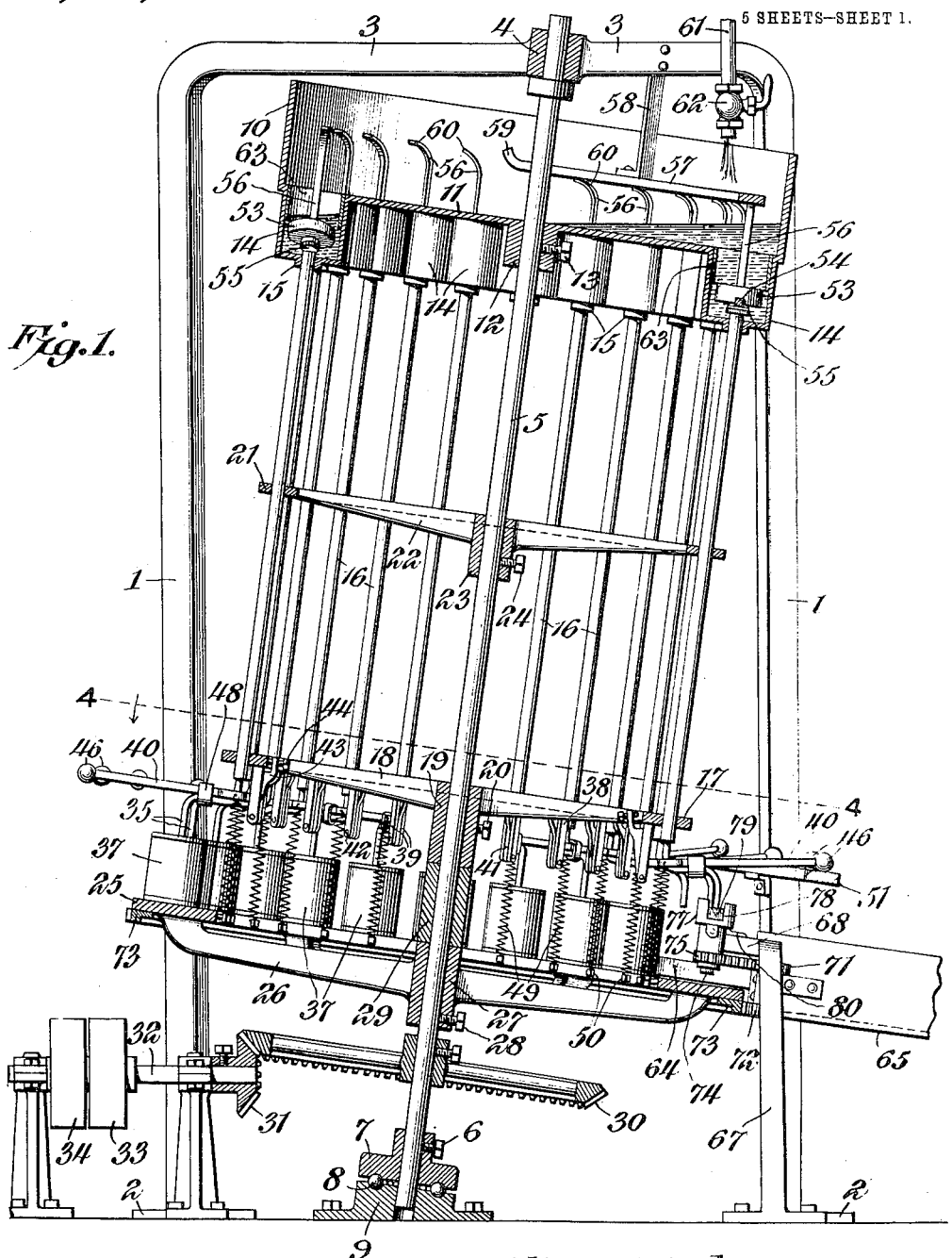

W. J. PHELPS.
CAN FILLING MACHINE.
APPLICATION FILED DEC. 19, 1910.

1,054,610.

Patented Feb. 25, 1913.
5 SHEETS—SHEET 1.

WITNESSES
Howard D. Orr
F. T. Chapman

Walter J. Phelps, INVENTOR,
BY
E. G. Siggers
ATTORNEY

W. J. PHELPS.
CAN FILLING MACHINE.
APPLICATION FILED DEC. 19, 1910.

1,054,610.

Patented Feb. 25, 1913.

5 SHEETS—SHEET 2.

WITNESSES
Howard D. Orr.
F. T. Chapman.

INVENTOR,
Walter J. Phelps,
BY
E. G. Siggers.
ATTORNEY

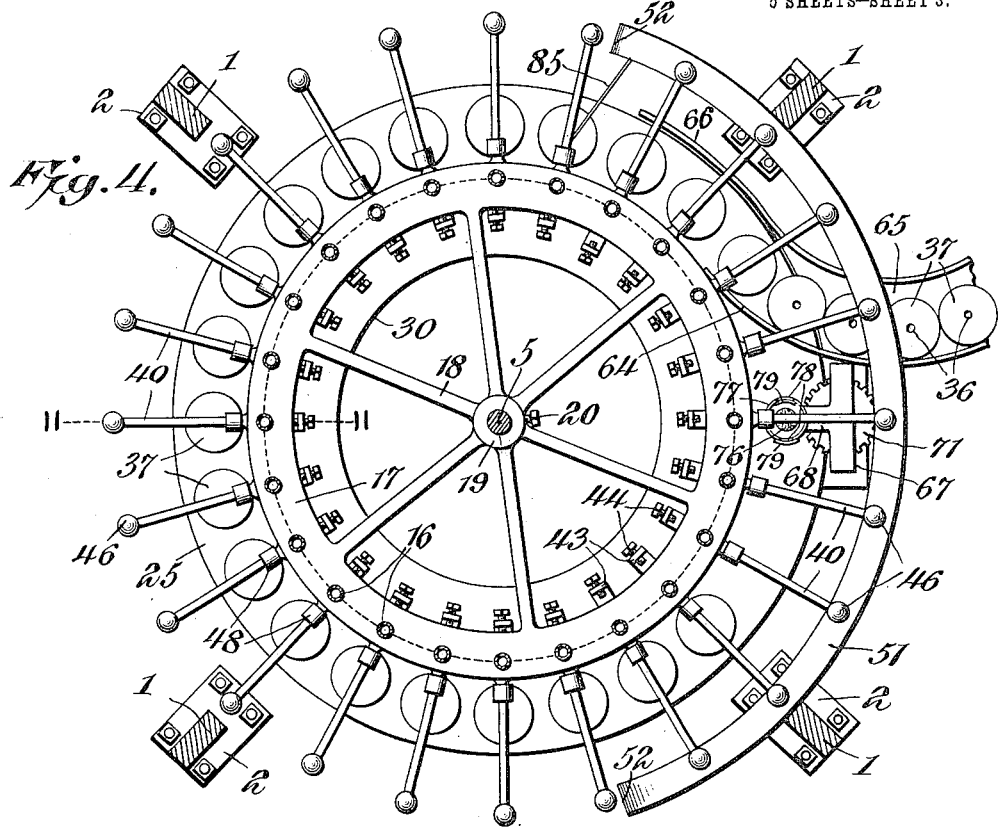

W. J. PHELPS.
CAN FILLING MACHINE.
APPLICATION FILED DEC. 19, 1910.
1,054,610.
Patented Feb. 25, 1913.
5 SHEETS—SHEET 4.
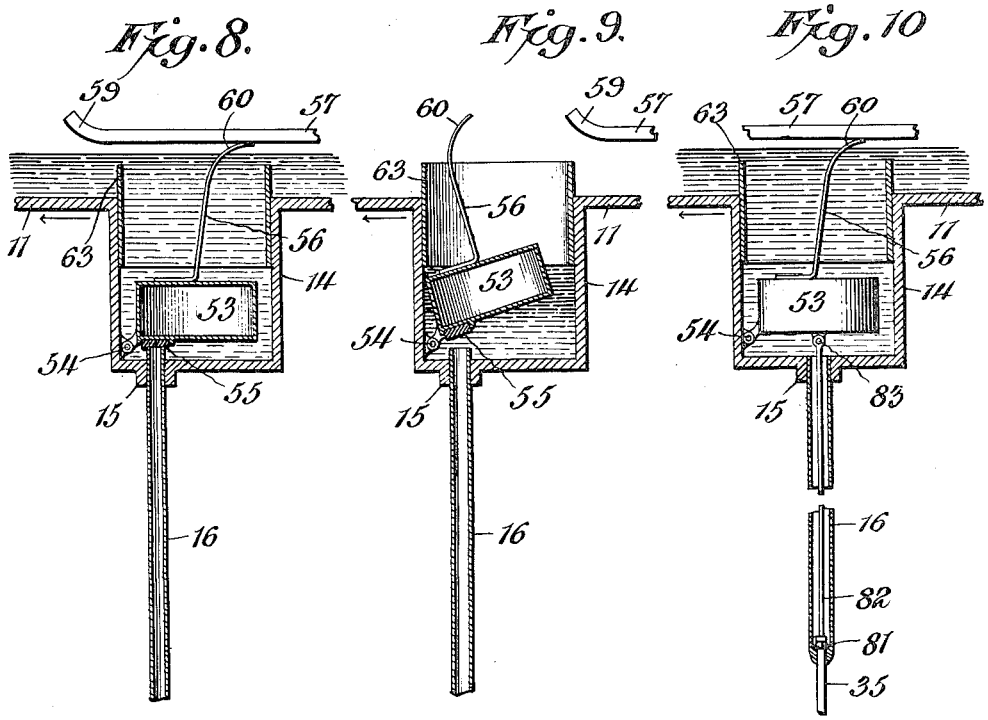
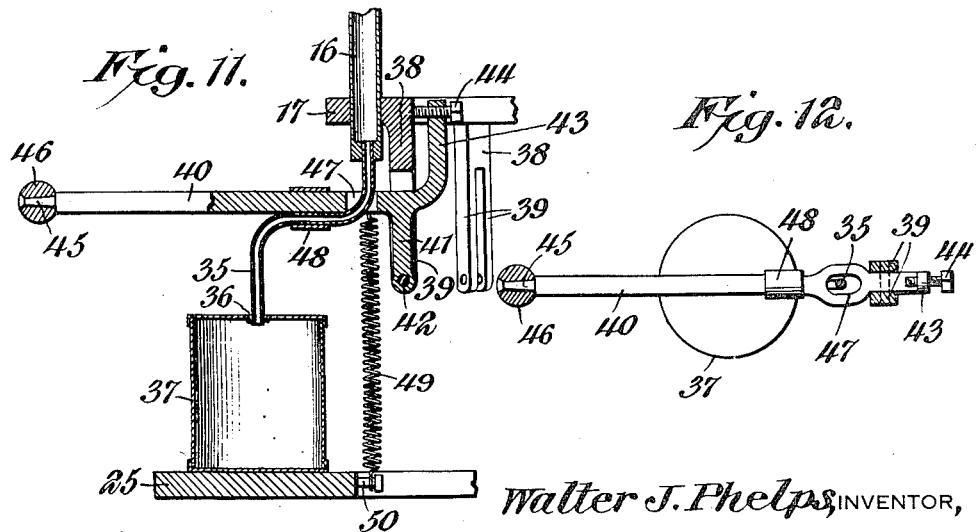
Walter J. Phelps, INVENTOR,
WITNESSES
BY
ATTORNEY W. J. PHELPS.
CAN FILLING MACHINE.
APPLICATION FILED DEC. 19, 1910.
1,054,610.
Patented Feb. 25, 1913.
5 SHEETS—SHEET 5.
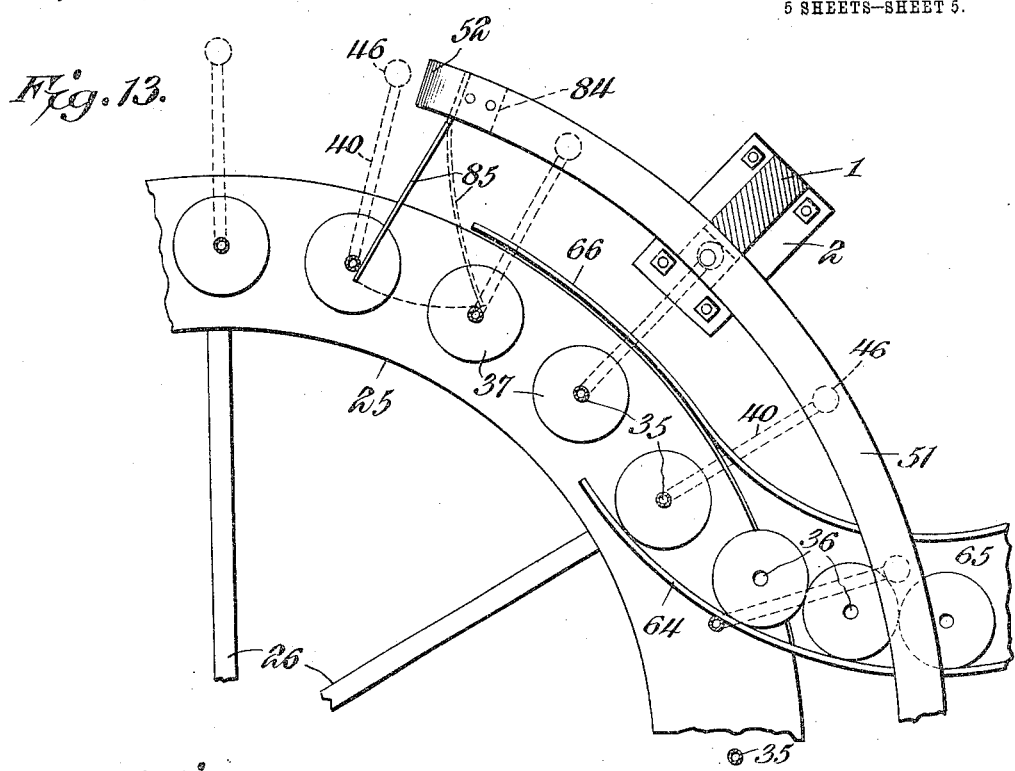
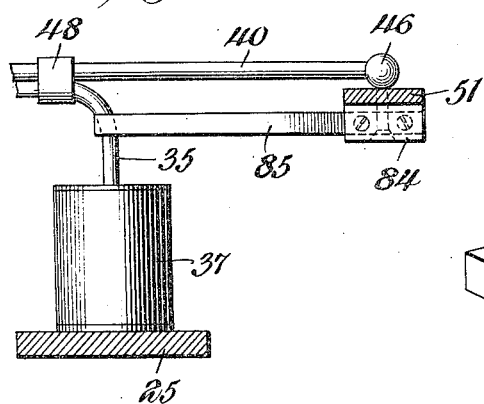
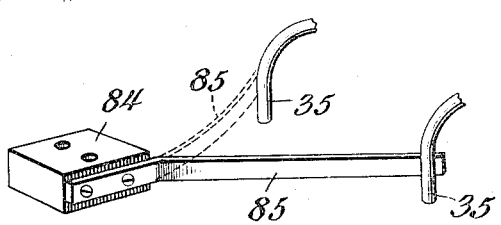
WITNESSES
Walter J. Phelps, INVENTOR,
BY
ATTORNEY

UNITED STATES PATENT OFFICE.

WALTER J. PHELPS, OF BALTIMORE, MARYLAND, ASSIGNOR OF ONE-HALF TO FRANK GEBBIE, OF ROCHESTER, NEW YORK.

CAN-FILLING MACHINE.

1,054,610.　　　　　Specification of Letters Patent.　　Patented Feb. 25, 1913.

Application filed December 19, 1910. Serial No. 598,063.

*To all whom it may concern:*

Be it known that I, WALTER J. PHELPS, a citizen of the United States, residing at Baltimore, in the State of Maryland, have invented a new and useful Can-Filling Machine, of which the following is a specification.

This invention has reference to improvements in can filling machines, and while of general utility for such purposes, is designed more particularly for the filling of cans with milk, especially the form of milk known as evaporated milk, where a certain proportion of the water naturally present in the milk has been removed, so that the resultant product is of greater density than milk in its normal condition.

The invention may be used for the filling of cans with other liquids of like or greater or less density than evaporated milk, and while for convenience of description the machine will be considered as designed for the filling of cans with evaporated milk, it is to be understood that the invention is not limited to such use, but may be used for any purpose for which it is adapted.

The machine of the present invention is particularly adapted for the filling of cans which are fully sealed, except there is left a small central perforation in that end of the can which may be termed the top of the can, and it is through this small perforation that the milk is introduced into the can, there being employed a filling tube of such dimensions that the milk may pass through the tube to the interior of the can and the air within the can may escape through the small perforation by way of a space between the outer walls of the filling tube and the walls of the perforation. At the same time the perforation is of such comparatively minute size that the application of a very small quantity of solder is sufficient to complete the sealing of the can.

In accordance with the present invention the flow of the milk into the cans is caused by gravity, and in order that each can may receive a measured quantity of milk, measuring cups are employed, one for each can, and the measuring cup is sufficiently elevated with relation to the can to cause the flow of the milk by gravity from the cup to the can within a definite proportion of the complete cycle of operation of the machine, the parts being so adjusted and proportioned that the flow of the milk may take place without causing foaming, which occurs when too great a speed of travel is imparted to the milk, and, at the same time, the rate of flow of the milk is made sufficiently rapid to cause the cans to be filled within a reasonably quick time. The flow of the milk from the measuring cups to the cans is caused solely by gravity, thus avoiding complication, such as is due to the use of impelling means for the milk, whether such impelling means be in the form of positively actuated force pumps or gravity plungers. At the same time all dribbling of the milk at the end of the pipe or conduit where entering the can is prevented and the passage of the milk from the measuring cup to the conduit leading to the can is so controlled that while the buoyant action of the milk upon a valve is utilized to open a valve, the said valve is positively and firmly closed while the measuring cups are being filled, and is held closed until such time in the cycle of operations as it is desired to open the valves. The measuring cups are filled by the overflowing action of a quantity of milk, and the machine is so constructed that without the use of cams or other actuating means the cups are carried out of the milk supply while being emptied of their contents.

The invention will be best understood from the following detailed description, taken in connection with the accompanying drawings forming a part of this specification, with the understanding, however, that while the drawings show a practical embodiment of the invention, the latter is susceptible of other practical embodiments while still retaining the salient features of the invention.

Figure 2:
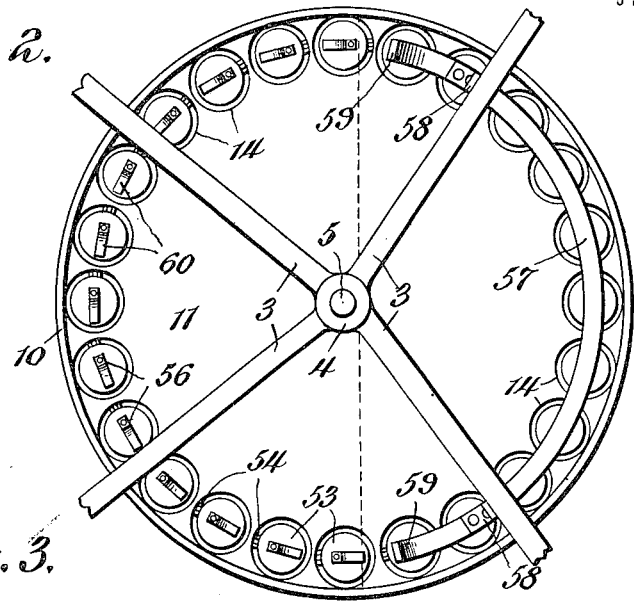
Figure 3:
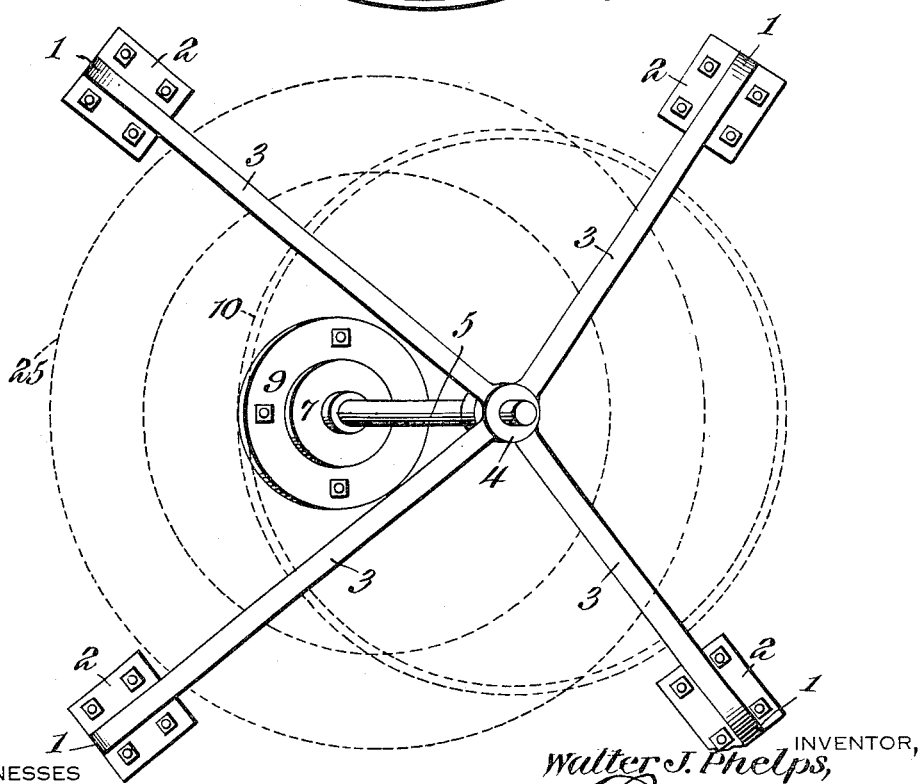

In the drawings:—Figure 1 is a vertical axial section of the can filling machine with some parts shown in elevation. Fig. 2 is a top view of the milk reservoir and the measuring cups carried thereby, the view being taken in the line of the axis of rotation of the reservoir. Fig. 3 is a top plan view of the framework of the machine showing the main shaft in position therein. Fig. 4 is a section on the line 4—4 of Fig. 1 with some of the more distant parts omitted. Fig. 5 is a section on an enlarged scale through a cleaning device for the discharge ends of the milk conduits. Fig. 6 is a plan view of the cleaning device of Fig. 5 as viewed in the line of the axis of rotation of the cleaning brush. Fig. 7 is a section on the line 7—7 of Fig. 6. Fig. 8 is a detail section of one of the measuring cups with some adjacent parts showing the position of the controlling valve while the cup is in that portion of the reservoir where overflowed by the milk therein. Fig. 9 is a view similar to Fig. 8, but showing the position assumed by the valve in the cup after the valve has been released and has moved to the open position under the buoyant action of the contained milk. Fig. 10 is a view similar to Fig. 8 but showing a modified construction of the valve mechanism. Fig. 11 is a section with parts in elevation on the line 11—11 of Fig. 4, but drawn to a larger scale. Fig. 12 is a plan view of a portion of the structure shown in Fig. 11 with some parts shown in section. Fig. 13 is a plan view of a portion of the structure shown in Fig. 4 on a larger scale and illustrating means for jarring the discharge ends of the milk conduits after the filling operation has been completed. Fig. 14 is a detail view of the terminal portion of one of the conduits and adjacent parts and showing the jarring means. Fig. 15 is a perspective view showing the jarring means detached and illustrating its action with respect to the terminal portions of the milk conduits.

Referring to the drawings, there is shown a main frame comprising in the particular instance shown four posts 1, provided with supporting feet 2 for attachment to a flooring, and at the upper ends these posts are formed with approaching arms 3 uniting in a boss 4 to one side of the center line of the framework. The boss 4 is provided with a passage constituting a journal bearing for a shaft 5, the said journal bearing being the upper journal bearing for the shaft, considering the machine as installed. Secured to the lower end of the shaft, by means of a set screw 6, is a bearing plate 7 provided with a suitable race for a series of balls 8 which engage in a similar race in a step bearing block 9 which may be made fast to the flooring, and is provided with a passage for the lower end of the shaft 5, thus centering the latter in said block. It will be observed that the block 9 is to one side of the center line of the main frame, while the bearing 4 is displaced with relation to the said center line to the other side thereof, so that an inclination is imparted to shaft 5 with relation to the center line of the main frame, the latter being considered as upright or substantially vertical in the installed machine. The supporting surface of the block 9 is therefore correspondingly inclined, and the passage for the lower end of the shaft 5 formed in said block is inclined to correspond.

Near the upper end of the shaft 5 there is secured thereto a reservoir 10 in the form of a short cylinder open at one end, which constitutes the upper end in the installed machine, and closed at the other end by a web 11 constituting the bottom of the reservoir in the installed machine. It is customary to cast the reservoir 10 with its bottom 11 in one piece, and at the center of the bottom web 11 there is formed a boss 12 through which there is a passage for the shaft 5, and the reservoir may be made secure to the shaft by a set screw 13 passing through the boss 12. It is customary in machines of this character to provide more than one set screw 13, and, of course, the same practice may be followed in the machine of this invention, although but one set screw 13 is shown in the drawings.

Near the junction of the bottom 11 with the side wall or body portion of the reservoir 10, the bottom 11 is formed with a circular series of cups 14 opening through the bottom 11 into the body of the reservoir, the open end of each cup, in the particular showing of the drawings, being of the same diameter as the body portion thereof, which construction is the preferable, though not necessarily the only construction which may be followed.

While the reservoir 10 with its bottom 11 and the cups 14 are shown as all formed integral one with the other, this is not a mandatory construction, since the parts may be separately formed and united in any appropriate manner, as, for instance, by soldering, since these parts may be made of tinned copper or even copper without tinning.

The bottom of each cup 14 is shown as formed with a boss 15, which, however, is to one side of the center line of the cup, and in this boss there is secured one end of a pipe 16 which may be a quarter inch or a three-eighths inch brass tube usually about six or seven feet long, but this tube may be longer or shorter depending upon the size of the machine and the desired speed of travel of the milk.

There being a circular series of cups there is also a corresponding circular series of pipes or tubes 16, and at the lower end these tubes are supported in proper spaced relation by a ring 17 suitably perforated for the passage of the tubes and constituting the rim of a spider having arms 18 connecting the rim to a hub 19 mounted on the shaft 5 and made fast thereto by a set screw 20, or more than one set screw if desired. When the tubes 16 are quite long they may be further supported intermediately by a perforated ring 21 carried by arms 22 radiating from a hub 23 made fast to the shaft by a set screw 24, and in machines where the tubes 16 are of sufficiently great length, other supporting and spacing rings 20 may be employed.

At an appropriate distance below the ring 17 there is provided an annular table 25 carried by arms 26 radiating from a hub 27 made fast to the shaft 5 by a set screw 28, or more than one set screw, if desired, and the proper spacing of the table 25 with relation to the ring 17 may be brought about by an intervening spacing sleeve 29 carried by the shaft 5, but this spacing sleeve 29 is not mandatory.

Motion may be imparted to the shaft 5 by means of a gear wheel 30 made fast to the shaft below the hub 27 and in mesh with a pinion 31 fast on a counter-shaft 32 carrying fast and loose pulleys 33—34, whereby power may be applied to the counter-shaft through a suitable belt, as is customary. The tight and loose pulleys may, however, be taken as indicative of any driving means whether direct-connected or not, it being a common practice to use an electric motor in direct connection with such a transmission means as the pinion 31 for imparting motion to the main shaft of the machine.

Each tube 16 at the lower end is reduced in diameter, and there receives another tube 35 of smaller diameter than the tube 16, the diameter of the tube 35 being such as to readily enter a central perforation 36 in a can 37 and still leaving space for the escape of air from the can when the tube 35 is in the perforation 36. The can 37 is such as is commonly employed for the canning of evaporated milk, and in the installed machine the cups 14 will be proportioned to the cans 37, but, as will hereinafter appear, the machine is readily adaptable to the filling of cans of different capacities.

The ring 17 has formed thereon adjacent the passages for the tubes 16 depending brackets 38 each formed with spaced ears 39 for the passage of a lever 40, the said lever having an offset 41 connected to the ears by a pivot pin 42. The lever has a shorter arm 43 bent at an angle to the length of the lever, so as to extend adjacent the inner edge of the ring 17, and there carries a set screw 44 adapted to engage the ring and so limit the travel of the lever in one direction. The other arm of the lever constituting the longer arm terminates in a stud 45, which may either be formed on the lever or secured thereto, and this stud carries a roller 46 which, in the particular showing of the drawings, is in the form of a ball or sphere, but, of course, may be otherwise shaped, and has a purpose which will presently appear. The long arm of the lever adjacent the offset 41 has a passage 47 through it for the tube 35, and the tube after passing through the lever is bent into substantially parallel relation thereto, and at this point is secured to the lever by a clip 48. Beyond the clip 48 the tube is again bent so as to extend at approximately right angles to the lever and is of sufficient length to enter the perforation 36 of a can 37 when the lever is at the limit of its travel as permitted by the set screw 44. The lever is constantly urged in such direction by a spring 49 fast at one end of the lever, and at the other end to a pin 50 on the inner edge of the table 25.

Fast to appropriate legs 1 is a curved strip 51 in the path of the balls or rollers 46 on the ends of the levers 40, and in order that these levers may engage and leave the strip 51, the ends of the strip may be appropriately curved, as indicated at 52. The purpose of this strip 51, which is a lifting or cam strip, will appear hereinafter.

Within each cup 14 there is a hollow body or float 53 connected at one side, and preferably near one edge, to the cup by a hinge 54 adjacent the point of entrance of the respective tube 16 into the cup. Fast to the float 53 in position to engage the upper end of the tube 16 is a block 55 of rubber or other suitable material adapted to form a fluid tight closure with the end of the tube 16 which may be projected slightly into the cup. The float 53 with the block 55 constitutes a valve designed to close the end of the tube 16 where entering the cup under circumstances to be described. Carried by the float 53 is a spring finger 56 of a length to project through and beyond the open end of the cup in position to engage under a curved strip 57 carried by hangers 58 fast to appropriate ones of the arms 3 of the frame, and this strip has upwardly turned ends 59, so that the fingers 56, which have curved ends 60, may underride the strip 57 with the curved ends 60 in engagement with the under surface thereof and may engage and leave the strip without interference because of the upturned ends 59 thereof. The strips 51 and 57 are about coincident one with the other and both are located with relation to the rotatable portion of the structure at what may be termed the lowest point of travel of the respective parts controlled by these strips, both strips being fixed with relation to the rotatable members by being fast to the framework of the machine.

Milk may be introduced into the reservoir by means of a pipe 61 provided with a suitable valve 62 whereby the flow of milk into the reservoir may be controlled or entirely cut off as desired, and this pipe may be located adjacent to what may be termed the lower portion of the travel of the reservoir.

It is to be noted that the rotatable portion of the structure, namely, the shaft 5, the reservoir 10, the can carrier or table 25, and the other parts carried thereby, are inclined at an angle to the center line of the machine, which center line is, when the machine is installed, substantially vertical, and so far as the operation of the machine is concerned may be considered as vertical, so that the reservoir is tipped at an angle and its axis of rotation is at an angle to the vertical and consequently any fluid deposited in the reservoir will naturally flow to one side thereof, which side is the lower side of the reservoir because of such tipping. By maintaining a suitable level of fluid within the reservoir this fluid will naturally flow into the cups as they approach the lowest level, and these cups will move out of the fluid within the reservoir as they approach the highest level in their progressive movement caused by the rotation of the shaft 5. The level of fluid within the reservoir may be maintained substantially constant by a suitable regulation of the flow through the inlet pipe 61, which is assumed to come from a suitable source of supply, and this level may be such that the milk will flow into the cans only during a portion of the complete rotative movement of any one can, which portion may comprehend from one-quarter to one-third of such complete rotation. The strips 51 and 57 are sufficiently extensive to include a like range of travel of the rotatable parts, and preferably a little more.

Suppose that with a machine constructed as so far described there is introduced into the reservoir 10 a suitable quantity of evaporated milk, and that there is lodged upon the table 25 an appropriate number of cans 37 with the discharge ends of the tubes 35 inserted in the openings 36 of these cans. All those cups within the range of activity of the strip 57 have the fingers 56 engaging under the strip 57 and the valves controlled by these fingers are then in the closed position, positively closing the upper ends of the corresponding tubes 16, the elasticity of the fingers 56 compensating for any differences in distance between the strip 57 and the valve seats. Taking any one of the cups 14 and the corresponding can 37, the cup 14 on approaching the lowermost point of its travel first reaches the point where it is overflowed by the milk within the reservoir and the milk thereupon gravitates into the cup, but before this level has been reached the corresponding finger 56 has engaged under the strip 57 so that the valve at the upper end of the pipe 16 is closed, the closure being firm and positive, so that there is no possibility of leakage past the valve. The cup in its progressive movement ultimately passes the lowest level and then moves progressively upward until ultimately its upper end emerges from the milk in the reservoir, and then a further movement of the cup carries the end 60 of its finger 56 from under the corresponding end of the strip 57 when the buoyant action of the milk upon the float 53 causes the latter to turn on its hinge 54 sufficiently to fully uncover the upper end of the tube 16, and the milk in the cup will then flow out of the cup through the tube 16 and through the tube 35 into the can 37, the air within this can escaping through the opening 36 in the space about the tube 35 where entering the can. The tipping of the reservoir and of the cans is immaterial to this action except that the tipping should not be sufficient to cause the milk in the can 37, when the latter has been filled to the highest point, to reach the top of the can, for the can in its progress about the axis of rotation makes nearly one complete relative rotation, and if any milk gets on the under surface of the top of the can such milk when the inclination of the can becomes reversed may flow down the inclined top into fouling relation to the perforation, and later interfere with the proper soldering of the perforation unless the can be specially cleaned. The flow of milk from the measuring cup which is of a size to cause the filling of the can to the desired extent, is relatively fast or slow, depending upon the length of the tube 16, and the time during which the can is being filled being in part dependent upon the length of the tube, the machine is proportioned to have the rotative movement and the length of the tubes such that a can will become filled in about two-thirds or three-fourths of such rotation. The capacity of the cup is such that when the can has received the requisite amount of milk, the float 53 has dropped to a position bringing the block 55 into closing relation to the upper end of the tube 16, but since there is established an equilibrium between the buoyant action of the milk of the float and the outflow of the milk through the pipe 16 when nearly closed by the valve, the closure of the tube or pipe 16 due to the dropping of the float with the falling level of the milk within the cup is only an indifferent closure, but at this point the end 60 of the finger 56 of the cup under consideration is engaged by the upturned end 59 of the strip 57 and the valve is forced to the closed position and there held by the elasticity of the finger 60 under the compressing action of the strip 57 acting on the finger. The closure of the upper end of the tube 16 immediately arrests any further outflow of milk through the small or nozzle tube 35 and this tube is too small in diameter to permit the entrance of air through the milk therein contained, since the surface tension of the milk at the outlet end of the tube and the capillary attraction of the milk in the small tube effectually prevents any escape whatsoever of the milk from the end of the tube to cause dribbling which would occur if the valve at the upper end of the tube 16 were but indifferently closed. The valve in the cup is, however, moved positively and rapidly to the full open position by buoyant action of the milk upon the valve when the cup is full of milk and the finger 56 escapes from the strip 57, and then the flow of milk will commence and continue with a rapidity due to the action of gravity as determined by the length of the tube 16.

By tipping the rotative structure the cups are progressively filled and emptied without the necessity of any pumping mechanism or means for raising and lowering the level of the milk, such level in the present machine remaining substantially constant during the operation of the machine, except when purposely raised or lowered by a suitable manipulation of the valve 62.

The capacity of the cups 14 may be varied by providing each cup with a sleeve 63 movable into and out of the open end of the cup to increase or decrease the effective depth of the cup, the sleeve being held in adjusted positions by friction or otherwise. By this means the measuring cups are readily adaptable to cans of different sizes and by adjusting the table 25 with relation to the ends of the tubes 35, cans of different lengths may be used, while no adjustment is necessary where the capacity of the can depends upon its diameter, the length remaining the same, but such differences in capacity of the cans must be taken care of by elongating or shortening the effective lengths of the cups 14 by a suitable adjustment of the sleeves 63. Within limits the level of the milk within the reservoir may remain the same for different adjustments of the sleeves 63, or this level may be increased or decreased as found desirable, but need not at any time reach up the web 11 beyond the points defined by the terminals of the strip 57, so that the valves in the cups are always positively closed while the tops of the cups are below the level of the milk within the reservoir.

The filling of the cans is completed and the valves in the cups are closed before the cans in their progressive movement have come into operative relation to the strip 51, and, therefore, before the tubes 35 are lifted from the holes 36 in the cans by the riding of the rollers 46 upon the strip 51 and the consequent movement of the levers 40 against the action of their springs 49, the tubes 35 being sufficiently flexible to permit the slight movement of the discharge end of the tubes 35 to lift them out of the perforations 36, for these tubes need only be moved sufficiently to lift them above the tops of the cans. By providing a deflector 64 in overriding relation to the table 25 where the cans are approaching the lowest level after having been filled and after the tubes 35 are removed from the cans, such filled cans may be directed from the table 25 on to a chute 65 whereby they may be conveyed to any suitable point of disposal, as, for instance, to the sealing machine, or in case the sealing is done by hand the cans may be conveyed to the workman performing this operation. The deflector 64 may be comparatively low where engaging the cans, so as not to interfere with the tubes 35. Since the table is tilted it may occur that the cans after being disconnected from the tubes 35 will slide toward a lower level, and, therefore, a guard piece 66 may be provided exterior to the table in directing relation to the chute 65.

When the tubes are lifted from the cans there may remain upon these tubes a small exposed drop of milk which would be liable to smear the metal immediately surrounding the opening 36 of an unfilled can when the tube is inserted thereinto. To avoid this contingency each tube after leaving the filled can and before being inserted into an unfilled can is caused by the progressive movement of the rotatable part of the machine to traverse a cleaning mechanism, whereby any milk which may be exterior to the tube is removed therefrom. Any suitable structure for this purpose may be employed, and in the drawings I have shown a structure well adapted to the purposes of the invention.

Formed on a standard 67, which may also be used to in part sustain the chute 65 and may, also, sustain the deflector 64, there are arms 68, 69, respectively, inclined into approaching relation to the inclination of the shaft 5. Mounted in the arm 69 is a stub shaft 70 carrying at the upper end a gear wheel 71 and at the lower end a pinion 72, the latter meshing with an annular ring 73 fast to the outer edge of the table 25 below the same or in any other appropriate position to impart rotative movement to the pinion 72, and by the same through the shaft 70 to the gear wheel 71. Carried by the arm 68 is another stub shaft 74 carrying at the lower end a pinion 75 meshing with a gear wheel 71 and at the upper end carrying a rotatable brush 76 housed in a cup 77 fast on top of the arm 68 where traversed by the shaft 74. The cup 77 and brush 76 are in the path of the lower ends of the tubes 35 and the cup is cut away on opposite sides, as indicated at 78, so as not to interfere with the passage of the tubes 35, while the main body of the cup is above the upper end of the brush, so that any milk thrown out from the brush will be caught by the cup. To prevent the escape of any milk so thrown out through the cut away portions 78, these portions may be covered by flexible flaps 79, which will yield readily to the passage of the tubes 35 and will then return to the normal position completing the closure of the side walls of the cup. Since there may be more or less accumulation of the milk within the cup 77 it is provided with a branch tube 80, by which such milk may be conveyed to any suitable point of disposal. The multiplying gear from the table 25 to the brush 76 causes a rapid rotation of the latter and the passage of the lower ends of the tubes 35 through this rotating brush will cause the removal of any milk which may be on the outside of the tubes or protrude beyond the discharge ends of the tubes, and when the tubes are again inserted in an empty can there is no milk present to smear the opening. The operator is assumed to be standing between this cleaning apparatus and the corresponding end of the strip 51, and it is the duty of the operator to place empty cans upon the table 25 in position to be engaged by the corresponding tubes 35 as the rollers 46 leave the strip 51, and since the speed of movement of the machine is fairly moderate, an operator may readily position the can with the tube 35 entering the perforation 36, the said operator holding the can slightly elevated from the table 25 until the roller 46 runs off the strip 51, when the spring 49 will move the lever 40 in a direction to carry the tube 35 slightly into the can with the can resting on the table, and the comparatively slight inclination of the table will not impart to the cans a sufficient tendency to slide toward a lower level, what little tendency there may be present being overcome by the frictional engagement of the can with the table and by the resistance of the tube 35 engaging the cover of the can. The length of the strip 51 beyond the cleaning apparatus for the tubes 35, in the direction of the travel of the table need only be such as will enable the operator to properly position the cans with relation to the tubes 35.

It will be understood, of course, that the controlling means for applying power to and disconnecting it from the machine may be arranged within easy reach of the operator, so that should the operator fail to get a can in proper position in time the machine may be stopped until the proper positioning of the can has been accomplished.

In the foregoing description the float 53 has been described as carrying a valve block 55 designed to engage a valve seat formed by the upper end of the tube 16. Since this tube is straight the valve seat may be formed by the end of the tube 35 where entering this tube 16, and the valve 81 may be arranged in operative relation to the end of the tube 35 where entering the tube 16, as shown in Fig. 10, the valve being carried by the end of a rod 82 extending through the pipe 16 and beyond the upper end of the same, which in this case may be flush with the upper surface of the bottom of the cup 14 and may be connected to the float 53 by a pivot 83, so that when the float rises the valve 81 will inclose the tube 35 and when the float is forced downward by the strip 57 the valve 81 will engage the end of the tube 35 and so positively close it.

It is to be observed that in either filling structure the tube 16 and the tube 35 are full of milk at all times, so that the flow of milk into the can begins at once as soon as the valve permitting such flow is opened, and stops at once as soon as the valve is positively closed.

While an efficient means for cleaning the discharge ends of the conduits has been shown and described, it is to be understood that other cleaning means may be employed and that the invention is not necessarily confined to the particular means for this purpose shown.

The capacity of the machine, the speed of rotation of the inclined rotatable filling structure, and the length of the conduits may all be varied, depending upon the character of the liquid to be filled into the cans and upon other conditions. Taking evaporated milk as an example, the speed of flow of the milk into the cans is limited since the milk is liable to foam if the speed exceeds a certain limit. The capacity of the machine, however, may be enlarged by increasing the number of filling cups and conduits, which means a correspondingly increased diameter of the machine. If a certain definite time must be employed in the filling of a can then the speed of rotation of the tilting rotatable member may be such that the can will traverse the filling zone in such definite time, but the length of the conduits must be such that the milk will gravitate through them in the time specified. The number of cans filled within a definite period will, of course, depend upon the speed of the machine, but if it be desirable that the filling tubes or conduits shall be comparatively short so that the height of the machine is not excessive, then the actual elapsed time taken to fill a can is greater than when the tubes are long. However, by increasing the diameter of the rotatable member and providing a large number of filling units, the capacity of the machine may be maintained even though the time during which a can is being filled be materially increased. From this it will be seen that the invention is capable of numerous embodiments without any real or material modification of the invention and consequently the invention is not confined to any specific number of filling cups or length of filling tubes or size of any of the parts, since all these features may be varied within considerable limits.

When the flow of milk ceases there may remain at the end of the tube 35 a small globule of milk which it is the province of the cleaning brush to remove, but this globule of milk may be saved by being caused to leave the tube and drop into the can into which the milk has been filled. This may be brought about by jarring the tube 35, which will cause a detaching of this adherent globule to an extent which will leave the surface of the milk at the end of the tube 35 in concave form at, or a short distance above the open end of the tube, depending upon the violence of a blow delivered to the tube 35. This jarring of the tube may be employed in place of the cleaning brush or in conjunction therewith, or the jarring means may be omitted. In order to cause a jarring of the tube 35 where entering the can there is attached to the strip 51 close to the end where engaged by the on-coming rollers 46 of the lever 40, a block 84, and to this block there is attached an elastic arm 85 which may be in the form of a leaf spring. The free end of this arm 85 is so disposed that it will be engaged by the tubes 35 between the respective lever 40 and the discharge end of the tube, and this arm 85 being elastic will be bent by the progressive movement of the tube 35 under consideration until ultimately the free end of the arm escapes from the tube, when its elasticity will carry it to and beyond its normal position, and the parts are so related that this return movement of the arm 85 is sufficient to impart a blow to the next tube 35 in order, but the time relation of this action is so adjusted that the outflow of milk has been stopped by the closure of the respective valve in the cup supplying the can, but while the tube 35 is still entering the can, although it may be withdrawn from the can immediately after the blow is struck. The sudden jar imparted to the tube 35 will loosen any protruding drop of milk at the end of the tube 35, so that such drop of milk will fall into the milk in the can, but the blow need not be hard enough to cause any injury to the tube 35. In the arrangement shown in Fig. 13 the spring arm 85 is assumed to have struck a tube 35 then in a can but just prior to the engagement of the roller 46 of the lever 40 controlling such tube with the lifting strip 51. The progressive movement of the tube 35 after being struck by the arm 85 will cause a bending of this arm due to its elasticity until it finally escapes from the tube under consideration and by its elasticity moves rapidly to and beyond its normal position, giving a sharp tap to the next succeeding tube 35 in the order of rotation, thus jarring the latter to dislodge the adherent drop of milk if present. Since there is always a liability of some milk being present on the exterior of the discharge ends of the tubes 35, the cleaning brush may be employed in conjunction with the jarring arm 85.

What is claimed is:—

1. In a can filling machine, a liquid directing conduit having a terminal portion of a diameter to enter a small perforation in a can to be filled, means imparting to the terminal portion of the conduit a constant tendency in a direction to enter a can in its path, and means for bending the terminal portion of the conduit against its normal tendency to move it in a direction away from a can in its path.

2. In a can filling machine, a filling conduit having a terminal portion of reduced diameter sufficient to enter a small perforation in a can to be filled, a lever connected to the terminal portion of the conduit and movable to bend said terminal portion, a support for the lever to which it is pivotally connected, means on the lever for determining the limit of movement of the lever in a direction to carry the terminal portion of the conduit into a can in its path, and means for causing a movement of the lever in a direction to carry the terminal portion of the conduit out of a can in its path.

3. In a can filling machine, a filling conduit provided with a terminal portion of a diameter to enter a small perforation in a can to be filled, a lever connected to the terminal portion of the conduit and movable in one direction to cause the said terminal portion of the conduit to enter a can in its path, a spring connected to the lever and constantly tending to move it in the said direction, an adjustable stop member acting on the lever to determine the extent of movement thereof under the action of the spring, and means for moving the lever in the other direction to carry the terminal portion of the conduit out of a can in its path.

4. In a can filling machine, a measuring cup having an orbital path of movement, a conduit leading from said cup, a valve for said conduit having a buoyant member within the cup, an elastic finger carried by the buoyant member, and an operating strip for the finger in fixed relation thereto and coextensive with a portion of the orbital path of the cup for maintaining the valve positively closed during such travel of the cup irrespective of the normal tendency of the buoyant member.

5. In a can filling machine, a measuring cup, a conduit leading therefrom, a float interior to the cup and hinged thereto and provided with a closure for the conduit, the float and closure constituting a valve for the conduit, an elastic finger carried by the float, and an operating strip for the finger in fixed relation to the cup and coextensive with a portion of the orbital travel of the cup for maintaining the valve positively closed during such portion of the travel of the cup irrespective of the tendency of the float.

6. In a can filling machine, a rotatable series of measuring cups, a corresponding series of conduits leading from the cups and each having a terminal member movable with relation to the remainder of the conduit, a support for the cans to be filled in operative relation to the terminal members of the conduits, a supporting member for the cups, and means for moving the terminal members of the conduits out of entering relation to the cans subsequent to the completion of the filling operation to an extent to permit the placing of empty cans in operative relation thereto.

7. In a can filling machine, a rotatable member comprising a reservoir provided with a circular series of measuring cups depending therefrom, conduits leading from the bottoms of the cups in a downward direction and having terminal members adapted to enter small perforations in cans to be filled, operating levers for the terminal members of the conduits for moving said terminal members into and out of filling relation to cans in their paths, and a can carrier, and operating means for the means controlling the terminal portions of the conduits in fixed relation and located with reference thereto to move the terminal members of the conduits out of filling relation to the cans after the filling operation is completed and maintaining the terminal members in such position until empty cans may be applied.

8. In a can filling machine, a rotatable series of conduits having terminal portions adapted to enter small perforations in the cans to be filled, said terminal portions being movable out of filled cans and subsequently into empty cans, and means for cleaning the conduit terminals of adherent liquid and located constantly in the path of said conduit terminals to act on the latter during the interim between their removal from filled cans and their introduction into empty cans.

9. In a can filling machine, filling conduits for the liquid to be introduced into the cans, and means for cleansing the can entering ends of the conduits comprising a rotatable brush in the path of said can entering ends of the conduits.

10. In a can filling machine, a rotatable series of can filling conduits, and means for cleansing the can entering ends of the conduits comprising a rotatable brush in the path of said can entering ends, and driving connections between the rotatable member of the machine and said brush.

11. In a can filling machine, filling tubes having outlet portions adapted to enter small perforations in the tops of cans to be filled, means for moving the tubes from the cans on the completion of the filling operation, and means for imparting a blow to each tube subsequent to the completion of the filling operation and prior to the removal of the tube from the filled can, said means comprising an elastic arm in the path of the tubes, said arm being moved by each tube in succession and on escaping therefrom moving into engagement with the next tube under the elastic stress imparted to said arm.

In testimony, that I claim the foregoing as my own, I have hereto affixed my signature in the presence of two witnesses.

WALTER J. PHELPS.

Witnesses:
JOHN H. SIGGERS,
F. T. CHAPMAN.